United States Patent [19]

Camplin et al.

[11] 4,303,423
[45] Dec. 1, 1981

[54] ENGINE AIR CLEANER

[75] Inventors: Harry R. Camplin, Marine on the St. Croix, Minn.; Michael A. Shackleton, San Jose, Calif.

[73] Assignee: The United States of America as represented by the Secretary of the Army, Washington, D.C.

[21] Appl. No.: 874,731

[22] Filed: Feb. 3, 1978

[51] Int. Cl.³ .............................................. B01D 45/12
[52] U.S. Cl. ................................ 55/337; 55/DIG. 28; 55/426; 55/302; 55/294
[58] Field of Search ................... 55/294, 337, 272, 302, 55/424, 426, DIG. 28, 457

[56] References Cited

U.S. PATENT DOCUMENTS

| | | | |
|---|---|---|---|
| 1,031,862 | 7/1912 | Morse | 55/426 |
| 1,107,485 | 8/1914 | Bowser | 55/337 |
| 1,565,318 | 12/1925 | Fisher | 55/457 |
| 1,760,705 | 5/1930 | Ludlam | 55/337 |
| 1,789,717 | 1/1931 | Walker | 55/424 |
| 3,056,662 | 10/1962 | Ridgway | 55/426 |
| 3,792,573 | 2/1974 | Borsheim | 55/337 |
| 3,936,902 | 2/1976 | Shackleton et al. | 55/294 |
| 3,957,639 | 5/1976 | Schoen et al. | 55/294 |
| 4,014,673 | 3/1977 | Kinnison | 55/398 |

Primary Examiner—Gregory N. Clements
Attorney, Agent, or Firm—Peter A. Taucher; John E. McRae; Nathan Edelberg

[57] ABSTRACT

An engine air cleaner comprising a cylindrical housing containing an annular perforate cleaning medium and a set of pre-cleaning baffles in the housing space surrounding the cleaning medium. The baffles maintain the dust-laden gas in a swirling condition, thereby centrifugally forcing heavy dust particles away from the cleaning medium surface. A scavenger fan removes heavy dust particles from the housing before such particles can contact the cleaning medium.

3 Claims, 8 Drawing Figures

U.S. Patent  Dec. 1, 1981  Sheet 1 of 3  4,303,423

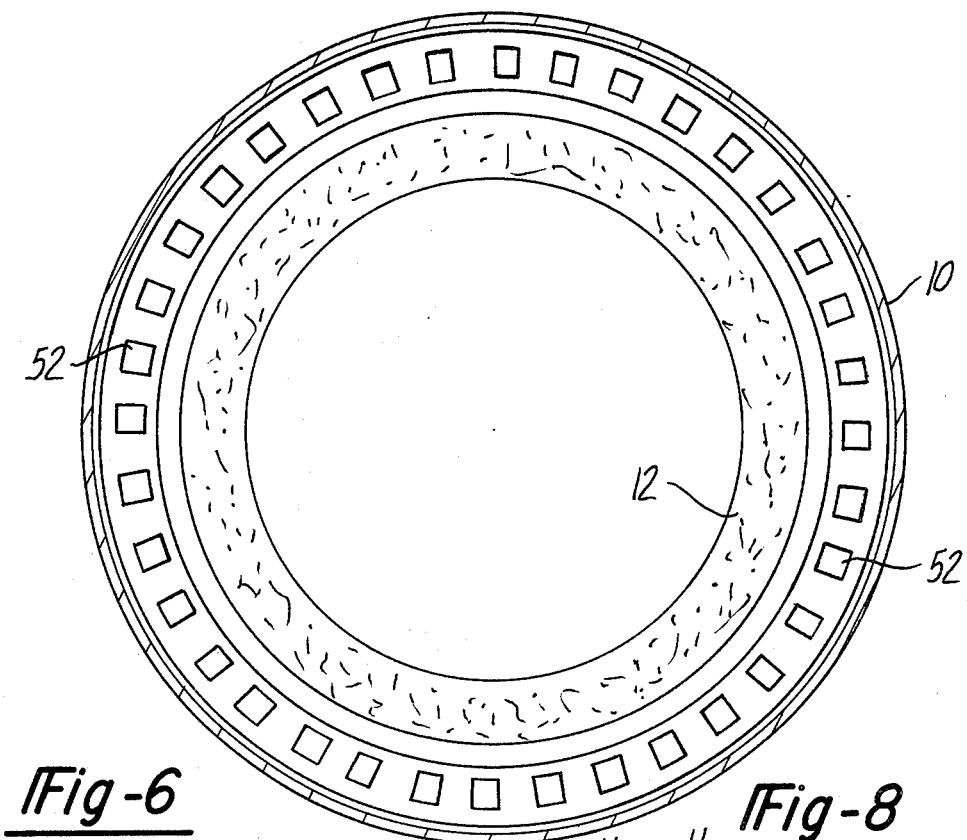
Fig-6
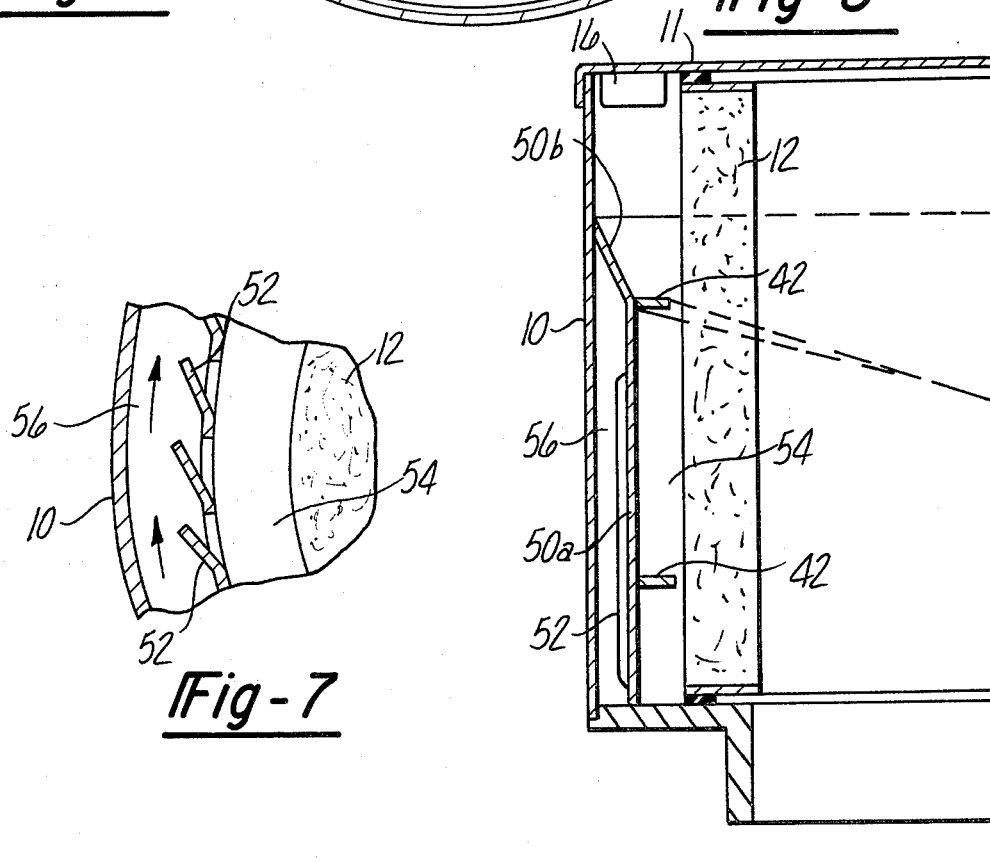
Fig-7
Fig-8

ENGINE AIR CLEANER

The invention described herein was conceived under U.S. Government contract DAAE07-73-C-0315 awarded to Donaldson Company, Inc. The invention may be manufactured, used, and licensed by or for the Government for governmental purposes without payment to us of any royalty thereon.

BACKGROUND AND SUMMARY OF THE INVENTION

This invention relates to an engine air cleaner that includes a porous perforate cleaning annulus, formed for example from pleated paper or felt. An annular air supply chamber surrounding the cleaning annulus is occupied by special baffles that impart a helical swirling motion to the dust-laden gas, thereby centrifugally forcing heavy dust particles to the outer area of the chamber. A scavenger fan draws the heavier dust particles from the supply chamber before such particles can migrate inwardly to the cleaning medium surface; the cleaning medium handles the lighter dust particles. A dust layer builds up on the medium surface at a relatively slow rate, thereby prolonging the service life and/or frequency of dust-dislodgement activity at the cleaning medium surface.

THE DRAWINGS

Figure 1:
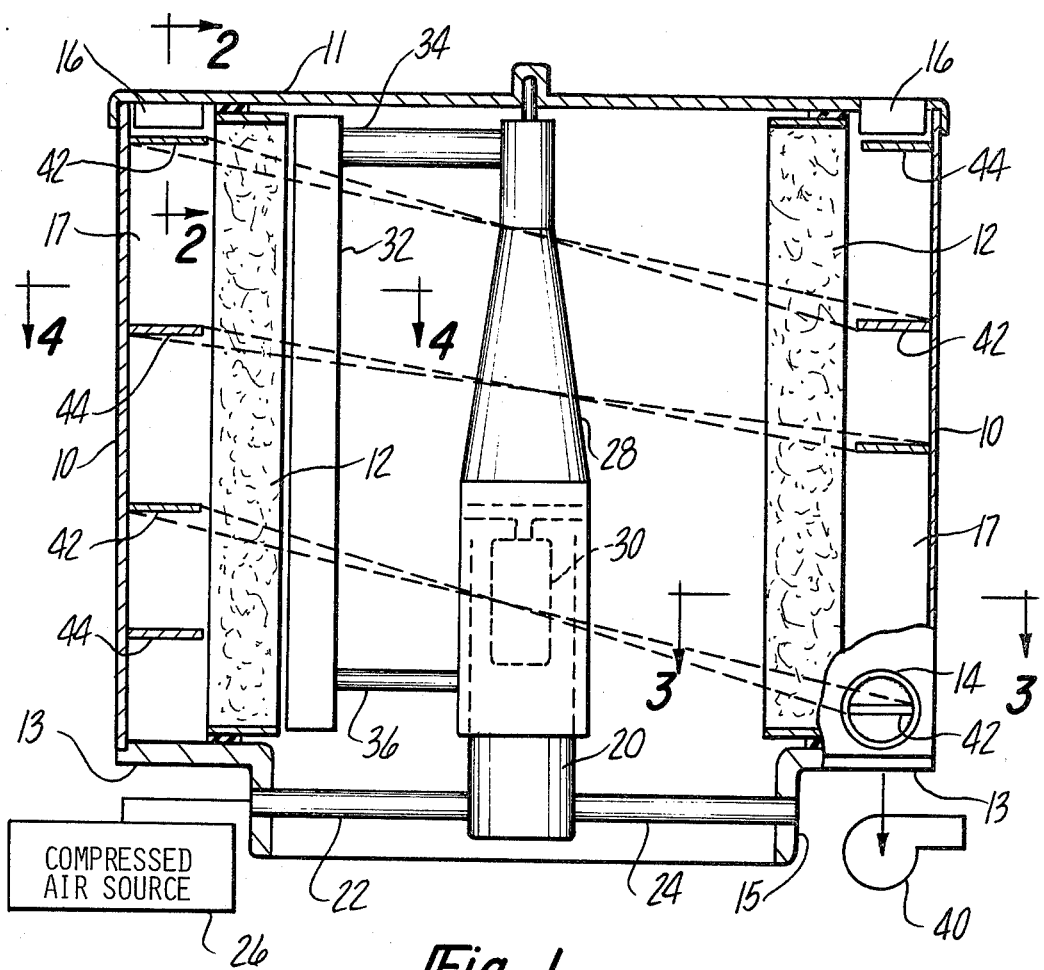

FIG. 1 is a sectional view taken through an air cleaner embodying this invention.

Figure 2:
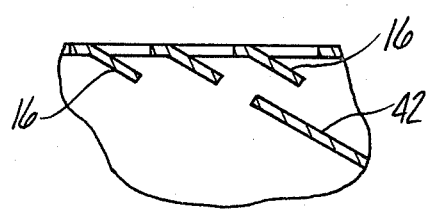
Figure 3:
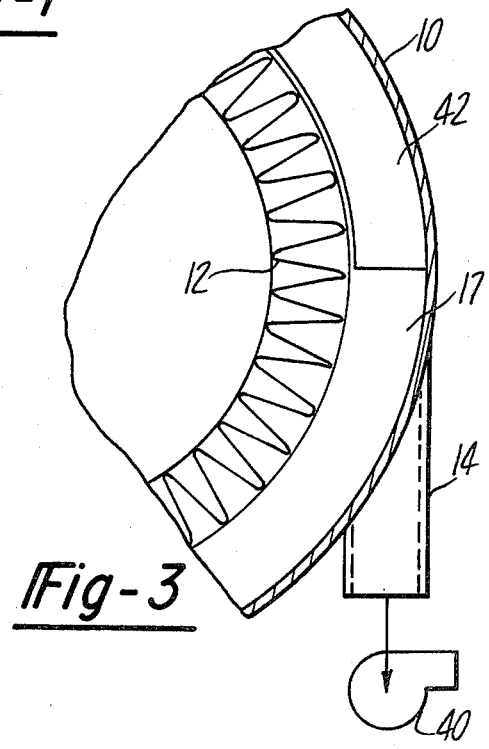
Figure 4:
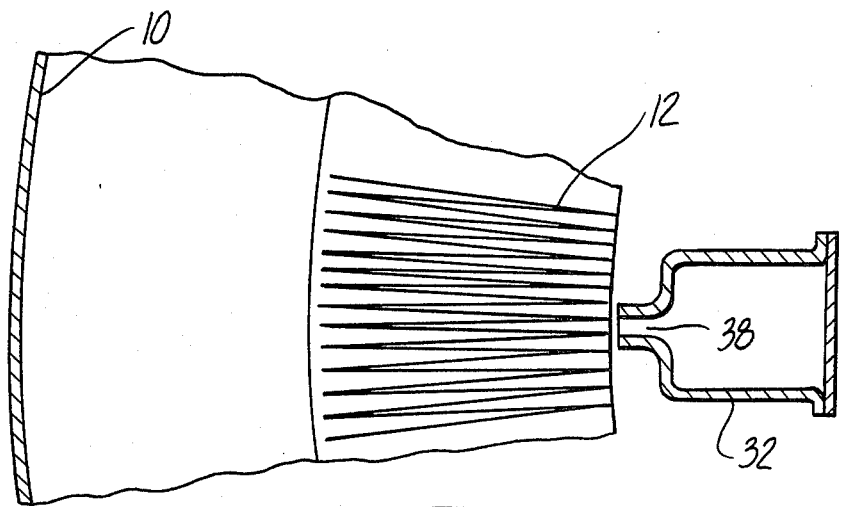

FIGS. 2, 3 and 4 are fragmentary sectional views on lines 2—2, 3—3 and 4—4 in FIG. 1.

Figure 5:
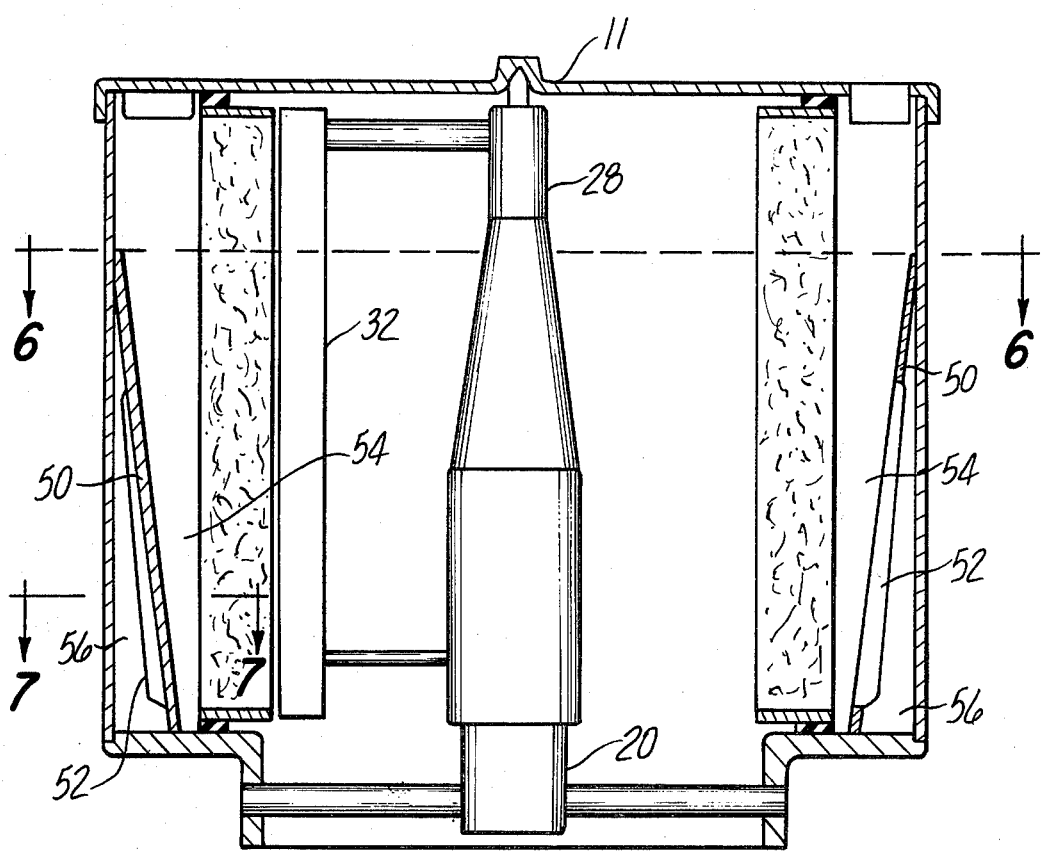

FIG. 5 is a sectional view taken through a second embodiment of the invention.

FIGS. 6 and 7 are sectional views on lines 6—6 and 7—7 in FIG. 5.

FIG. 8 is a fragmentary sectional view taken through a third embodiment of the invention.

In more particular reference to FIG. 1 there is shown an air cleaner for a non-illustrated turbine engine, said cleaner comprising a housing that includes a cylindrical side wall 10, and end walls 11 and 13. Wall 13 includes a flange 15 for mounting the cleaner on the non-illustrated turbine. The engine draws air from the superjacent atmosphere into inlet chamber 17 through ports defined by louvers 16 in end wall 11. As best seen in FIG. 2, each louver is acutely angled to the radial plane taken by the end wall. In a typical arrangement there would be thirty louvers acutely angled in a common direction to impart a helical swirling motion to the dust-laden air as it flows through the defined ports into annular chamber 17.

Swirling air in chamber 17 is caused to flow inwardly through a porous perforated cleaning medium 12, formed for example of pleated paper or felt. As best seen in FIG. 4, the cleaning medium pleats are relatively deep (in the radial dimension) and numerous. A typical cleaning annulus 12 would have an outer diameter of seventeen inches, and an inner diameter of thirteen inches; it would be folded to provide approximately four hundred pleats. Such an annulus could handle gas at a flow rate of about two thousand cubic feet per minute, with a cleaning efficiency of about 99% on a dust loading of about 0.025 grams per cubic foot of gas. Cleaned gas is drawn into the engine through the central space circumscribed by flange 15.

Periodically (or continuously if needed) the cleaning annulus 12 is subjected to a jet of high pressure air to dislodge dust accumulating on the pleat surfaces. The dislodgement apparatus may be constructed as shown in any of several patents, such as U.S. Pat. No. 3,716,968 to A. Mische, U.S. Pat. No. 3,568,414 to Spriggs et al, U.S. Pat. No. 3,936,902 to Shackleton et al, or U.S. Pat. No. 3,957,639 to Schoen et al. For purposes of illustration herein, we show the dust-dislodgement apparatus as comprising an upstanding cup 20 mounted on the housing by means of two tubular struts 22 and 24. Compressed air, at a pressure of about fifteen p.s.i., is delivered from source 26 through strut 22 to cup 20 for upflow into a rotary duct 28; gear motor 30 affixed to cup 20 powers duct 28 around the central axis of the air cleaner; electrical lead wiring for the motor can be extended through strut 24.

Duct 28 is connected to a manifold 32 by means of a radial duct 34 and support arm 36. As best seen in FIG. 4, the manifold is provided with slot-like nozzle openings 38 for discharging compressed air from the manifold into the pleats of cleaning annulus 12; the intent is to blast the dust particles from the pleated surface outwardly into chamber 17 toward housing side wall 10. A dust scavenger fan 40 (FIG. 1) is connected to chamber 17 for drawing the dislodged dust particles out of the chamber before they can re-impact on the pleats of cleaning medium 12.

The present invention is directed to baffle means for minimizing the quantity of dust particles contacting the surface of cleaning medium 12, the intent being to prevent early (premature) clogging of the medium 12 surface. In the FIG. 1 cleaner the anti-clog purpose is achieved by one or more helical guide ramps that extend from housing side wall 10; these guide ramps maintain the air-dust mixture in the swirling condition initially induced by louvers 16, thereby contrifugally forcing heavy dust particles outwardly into near adjacency to wall 10. The particles are thereby deterred from early migration back toward the surface of cleaning medium 12.

In the FIG. 5 cleaner the baffle means comprises a perforated wall structure that is formed with a series of dust-deflector vanes. These vanes are oriented so that swirling dust particles have relatively easy entry to the space surrounding the perforated wall but relatively difficult entry back to the zone near the cleaning medium. Dust tends to concentrate in an outer area of the inlet chamber where it can be drawn off by the aforementioned scavenger fan 40.

Referring especially to FIG. 1, there are shown two helical ramps 42 and 44, each extending inwardly from housing side wall 10 to an edge termination plane substantially at the outer surface of cleaning medium 12. Ramp 42 initiates beneath the leftmost set of louvers 16 in FIG. 1; ramp 44 initiates beneath the rightmost set of louvers. Each ramp angles in the same direction so that each ramp acts as a helical guide for only part of the total gas flow through louvers 16. The number of ramps is related to such factors as manufacturing cost, air guide improvement for each added ramp, and pressure drop produced by each added ramp. If a sufficient number of ramps were used it might be possible to eliminate louvers 16. In the illustrated arrangement the leading end of each ramp is angled at the same angle as the superjacent louver 16, as shown in FIG. 2. However, the ramp helix pitch angle may be decreased as the ramp progresses toward end wall 13. Such decrease in pitch angle may be utilized to maintain a desired swirl in the decelerating gas stream; such deceleration is due to the fact that gas is continually being removed from the swirling stream through the pores in cleaning medium 12. Total gas volume reaching the take-off tube 14 (FIGS. 1 and 3) may be only a small percentage of the volume initially supplied through louvers 16, depending on the operating characteristics of fan 40. For example, the incoming flow through louvers 16 might be about 2000 c.f.m., whereas the scavenger flow through tube 14 might be only about 100 c.f.m. By tightening the helix on each ramp 42 or 44 during progression thereof toward wall 13 it may be possible to maintain a relatively high linear flow rate in the gas stream along the surface of wall 10. A high linear flow rate is desired for maximizing the centrifugal dust separation effect and preventing re-entrainment into the gas flowing through medium 12.

The air cleaner of FIGS. 5, 6 and 7 includes a frusto-conical subdivider wall 50 having perforations therein defined by vanes 52; as shown in FIG. 7 the vanes angle outwardly from the wall structure plane to form openings for flow of fluid from space 54 (adjacent to medium 12) to space 56 (adjacent to wall 10). Because wall 50 contacts wall 10 at its upper edge the vane 52 openings constitute the sole communicating path between spaces 54 and 56. The volume of space 56 is selected to be appreciably less than the volume of space 54. Therefore, the scavenger fan 40 is enabled to achieve a relatively high linear flow in space 56 (necessary for centrifugal dust separator action).

Swirl imparted to the incoming gas by louvers 16 tends to decay at a faster rate (as compared to the FIG. 1 device). However this is compensated to a certain extent by the fact that wall 50 effectively reduces the free cross sectional area of chamber 17 as the gas approaches wall 13. The gas is therefore forced into a slightly tighter swirl, to thereby maintain a certain linear velocity in space 54.

It is believed that the action of scavenger fan 40 augments the swirl action of the gas within space 54. Thus, fan 40 produces a circumferential flow in space 56, as designated by the flow arrow in FIG. 7. Should the swirl in space 54 tend to slow down then the swirl in space 56 will tend to induce swirl into the space 54 gas.

It will be noted that vanes 52 are oriented so that swirling gas in space 56 has a difficult mode of entry to space 54; i.e. the gas must negotiate a reverse turn around the vane edge in order to reach space 54. Conversely, the gas in space 54 has a relatively easy entry path into space 56. This action tends to promote centrifugal movement of heavy dust particles into chamber 56 while deterring reverse movement of such particles back toward the cleaning medium 12.

Vanes 52 are oriented so that their longitudinal dimensions extend approximately parallel to the housing axis defined by cylinder 10. These vanes therefore exert a dust-deflecting effect on the gas in space 56 without exerting flow restriction in the axial direction.

FIG. 8 utilizes a combination of features used individually in FIGS. 1 and 5, namely helical ramp 42 and subdivider wall 50. The FIG. 8 subdivider wall includes a lower cylindrical section 50a and an upper frusto-conical section 50b; the general operation of the subdivider wall is similar to that of the corresponding wall in FIG. 5.

We wish it to be understood that we do not desire to be limited to the exact details of construction shown and described for obvious modifications will occur to a person skilled in the art.

We claim:

1. In an engine air cleaner comprising a housing that includes a cylindrical side wall (10) defining the housing axis, and first and second end walls (11 and 13), an annular porous cleaning medium (12) disposed within said housing, the outer peripheral surface of the cleaning medium being spaced radially inwardly from the cylindrical housing side wall to define an annular inlet chamber therebetween; said first end wall (11) having a large number of circumferentially spaced air inlet guide louvers acutely angled to a radial plane taken at right angles to the housing axis, whereby dust-laden air is caused to take a helical swirling motion as it moves into the inlet chamber, a dust scavenger outlet tube (14) having a tangential connection with the cylindrical side wall at a point near said second end wall (13), and a scavenger exhaust fan (40) connected to the outlet tube for drawing at least some of the dust particles out of the air cleaner before such dust particles can make contact with the cleaning medium: the improvement comprising a baffle means extending within the annular inlet chamber to confine the air-dust layer adjacent the housing side wall to a helical flow pattern while said layer is advancing toward the second end wall; said baffle means comprising a perforated circular wall structure (50) extending from the second end wall toward the first end wall within the inlet chamber, said perforated wall structure subdividing said inlet chamber into an outer annular space (56) adjacent the housing side wall and an inner annular space (54) adjacent the cleaning medium, the perforations in said wall structure being defined by vanes (52) acutely angled outwardly from the general plane of the wall structure, whereby swirling fluid has an easy mode of entry from the inner space to the outer space but a difficult mode of entry from the outer space to the inner space; said vanes being oriented in the same circumferential direction as the aforementioned louvers, whereby the vanes present minimal resistance to the swirl pattern generated by the louvers.

2. The improvement of claim 1 wherein the perforated wall structure is constructed so that the inner annular space has a significantly greater volume than the outer annular space.

3. The improvement of claim 1 wherein the perforated wall structure (50) has a frusto-conical configuration, one end of said perforated wall structure being engaged with the second end wall of the housing, the other end of said perforated wall structure being engaged with the housing side wall at a point near the first end wall of the housing, the sole communication between the aforementioned inner and outer spaces is through the perforations defined by the vanes.

* * * * *